United States Patent
Maekawa et al.

(10) Patent No.: US 7,204,787 B2
(45) Date of Patent: Apr. 17, 2007

(54) ENGINE OUTPUT TORQUE CONTROL

(75) Inventors: Takuya Maekawa, Zama (JP);
Yoshitaka Matsuki, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 266 days.

(21) Appl. No.: 11/049,875

(22) Filed: Feb. 4, 2005

(65) Prior Publication Data

US 2005/0170931 A1 Aug. 4, 2005

(30) Foreign Application Priority Data

Feb. 4, 2004 (JP) ............................ 2004-028233

(51) Int. Cl.
*B60W 10/04* (2006.01)
(52) U.S. Cl. ...................... 477/111; 477/107
(58) Field of Classification Search ................ 477/107, 477/110, 111, 113, 120, 902
See application file for complete search history.

(56) References Cited

U.S. PATENT DOCUMENTS 5,816,976 A * 10/1998 Kuroiwa et al. ............ 477/102

| | | | |
|---|---|---|---|
| 6,024,669 A * | 2/2000 | Iwatsuki et al. ............ | 477/107 |
| 6,652,417 B2 * | 11/2003 | Iriyama ...................... | 477/111 |
| 2002/0019291 A1 * | 2/2002 | Ito .............................. | 477/92 |

FOREIGN PATENT DOCUMENTS

JP 9-105458 A 4/1997

* cited by examiner

*Primary Examiner*—Roger Pang
(74) *Attorney, Agent, or Firm*—Foley & Lardner LLP

(57) ABSTRACT

An automatic transmission (5) of a vehicle performs a downshift operation when a downshift signal is ON. When the downshift signal is ON, a controller (12) increases an output torque of an engine (1) so that a predetermined torque increase amount is realized. The controller (12) sets a torque increase permission period which is shorter, the larger the predetermined torque increase amount is (S209), and when the elapsed time from when the downshift signal is ON reaches the torque increase permission period, unnecessary increase of engine rotation speed and excessive torque load on the automatic transmission (5) are prevented by terminating increase of output torque (S211, S214).

13 Claims, 9 Drawing Sheets

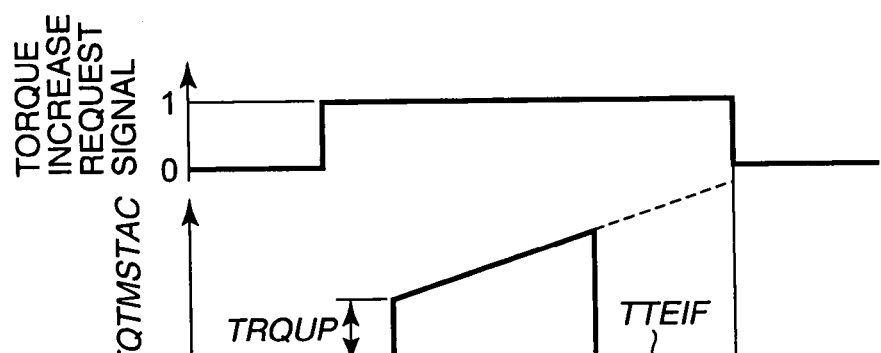
FIG. 9A
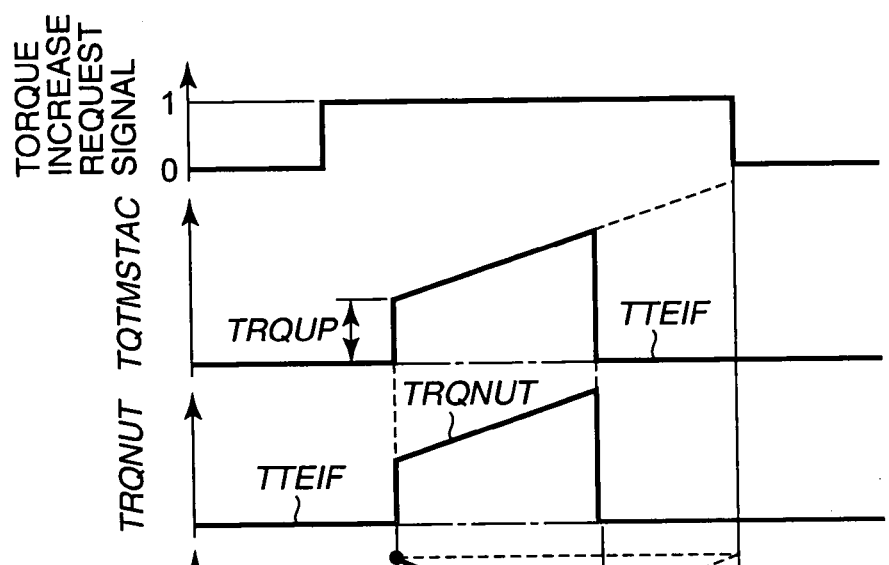
FIG. 9B
FIG. 9C
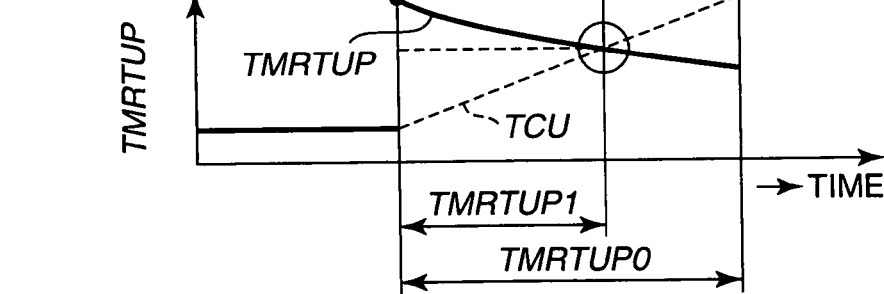
FIG. 9D

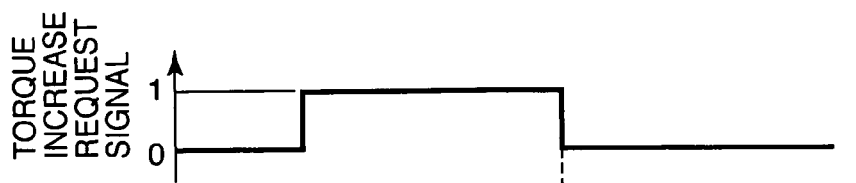
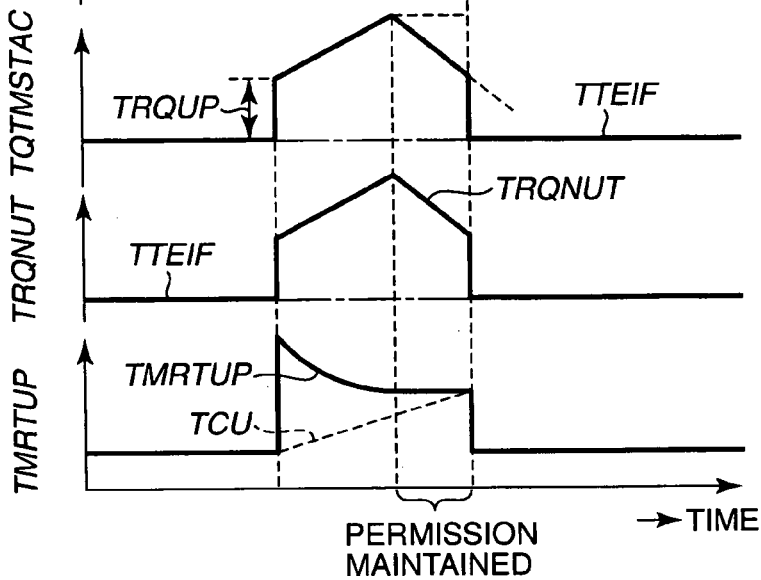
FIG. 10A
FIG. 10B
FIG. 10C
FIG. 10D
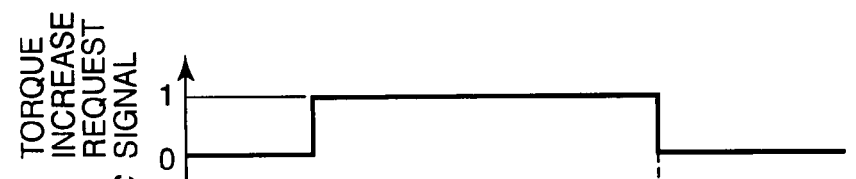
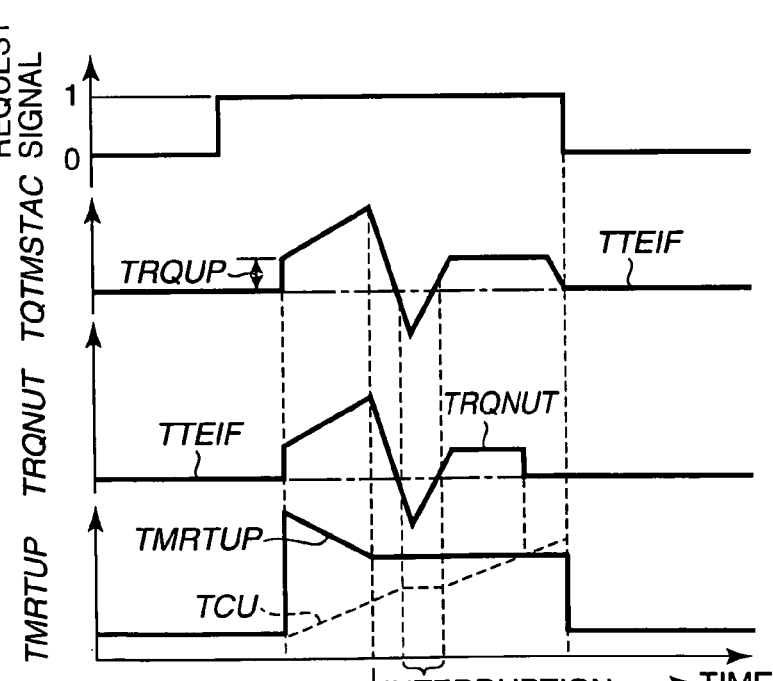
FIG. 11A
FIG. 11B
FIG. 11C
FIG. 11D

ENGINE OUTPUT TORQUE CONTROL

FIELD OF THE INVENTION

This invention relates to output torque control of an engine during downshift of a vehicle automatic transmission.

BACKGROUND OF THE INVENTION

Tokkai Hei 09-105458 published by the Japan Patent Office in 1997 discloses increasing an engine output torque to decrease a speed change shock during downshift of a stepwise automatic transmission of a vehicle.

In this prior art technique, a speed change shock is prevented by making the engine output torque increase from when one clutch starts to disengage one gear until another clutch starts to engage another gear. Specifically, in the prior art, the engine output torque for attaining the engine rotation speed after the downshift is calculated, and engine control is performed so that the calculated output torque is obtained. In the following description, this output torque will be referred to as a rotation synchronous torque.

SUMMARY OF THE INVENTION

In an automatic transmission provided with a manual operation mode which permits a manual gear shift operation by the vehicle driver, when a downshift is performed by manual operation, an unnecessarily large rotation synchronous torque is generated and an unnecessary engine rotation speed increase may occur.

Also, if an incorrect rotation synchronous torque is computed in either the manual operation mode or automatic operation mode, the excessive engine torque inputted into the automatic transmission during a clutch operation becomes a factor which adversely affects clutch durability.

It is therefore an object of this invention to perform more appropriate engine output torque control for speed change shock prevention.

In order to achieve the above object, this invention provides an output torque control device for an engine for use with an automatic transmission for a vehicle. The automatic transmission transmits an output torque of the engine to drive wheels at different speed ratios which are selectively applied, and performs a downshift operation when a downshift signal is ON. The output torque control device comprises a programmable controller programmed to determine whether or not the downshift signal is ON, increase the output torque of the engine so that a predetermined torque increase amount is realized when the downshift signal is ON, set a torque increase permission period which permits an increase of the output torque of the engine to be shorter, as the predetermined torque increase amount becomes larger, and terminate increase of the output torque of the engine when an elapsed time from when the downshift signal is ON reaches the torque increase permission period.

This invention also provides an output torque control method of the engine, comprising determining whether or not the downshift signal is ON, increasing the output torque of the engine so that a predetermined torque increase amount is realized when the downshift signal is ON, setting a torque increase permission period which permits an increase of the output torque of the engine to be shorter, as the predetermined torque increase amount becomes larger, and terminating increase of the output torque of the engine when an elapsed time from when the downshift signal is ON reaches the torque increase permission period.

The details as well as other features and advantages of this invention are set forth in the remainder of the specification and are shown in the accompanying drawings.

BRIEF DESCRIPTION OF THE DRAWINGS

FIGS. 9A–9D are timing charts describing the result of executing the torque increase control routine according to this invention.

FIGS. 10A–10D are similar to FIGS. 9A–9D, but showing a case where a rotation synchronous torque decreases during torque increase control.

FIGS. 11A–11D are similar to FIGS. 9A–9D, but showing a case where the rotation synchronous torque fluctuates.

DESCRIPTION OF THE PREFERRED EMBODIMENTS

Figure 1:
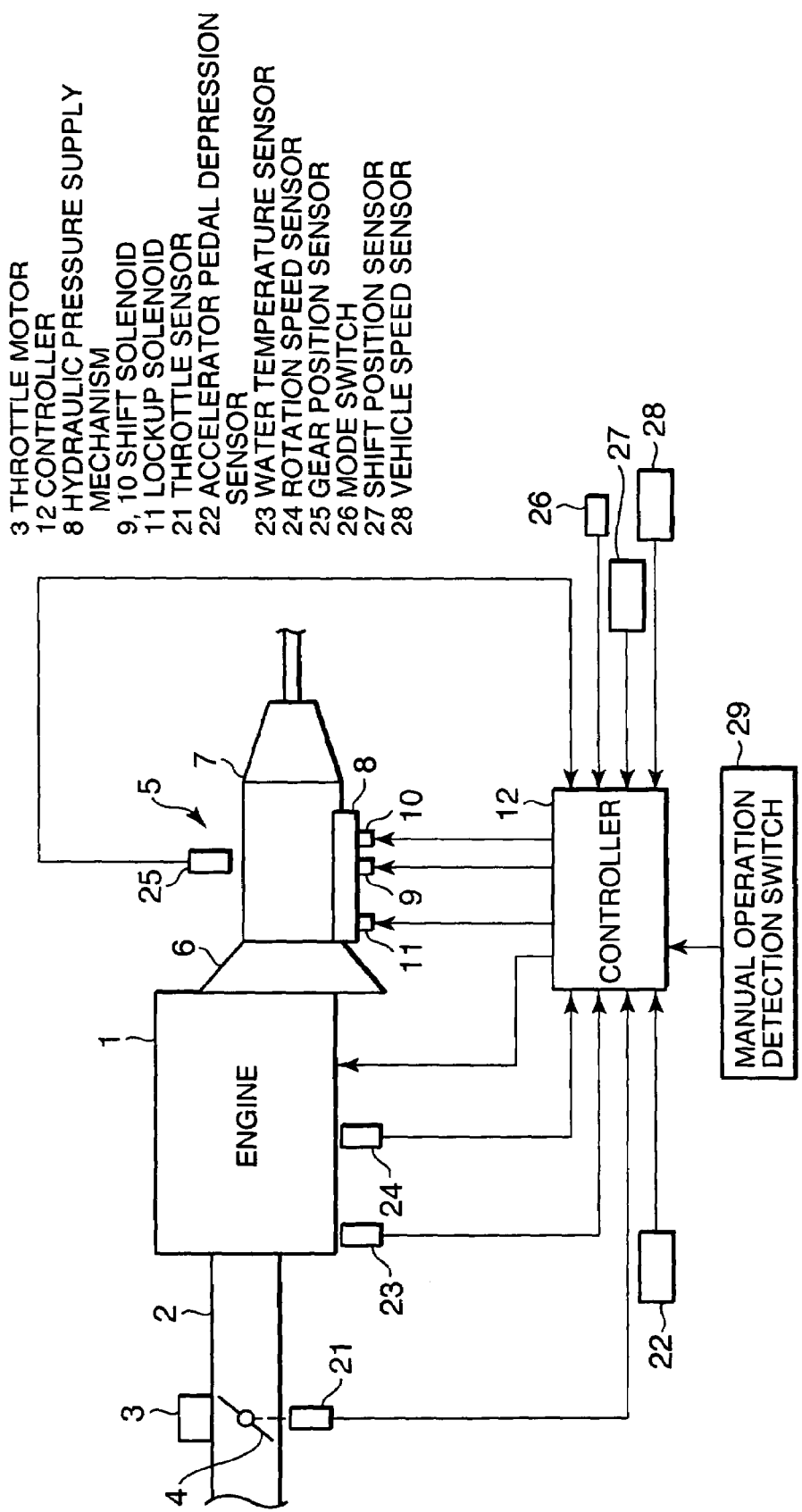
FIG. 1 is a schematic diagram of an engine comprising an output control device according to this invention.

Referring to FIG. 1 of the drawings, a vehicle engine 1 is provided with a throttle 4 driven by a throttle motor 3 in an intake passage 2.

An automatic transmission 5 is connected with the output axis of the engine 1.

The automatic transmission 5 is provided with an automatic operation mode and a manual operation mode which change gear according to an operation of the vehicle driver. The automatic transmission 5 is connected to the output axis of engine 1 via a torque converter 6. The automatic transmission 5 comprises a set of plural gears for transmitting torque, a speed change mechanism 7 known in the art comprising plural clutches which change over the torque transmission path between the gears, an oil pressure mechanism 8 which engage and disengage the clutches, shift solenoids 9, 10 which control oil pressure supply from the oil pressure mechanism 8 to the speed change mechanism 7, and a lock-up solenoid 11. The shift solenoids 9, 10 are solenoids which perform clutch operations required for speed change operation, and the lock-up solenoid 11 is a solenoid which performs lock-up of the torque converter 6. In the following description, the torque transmission path of the speed change mechanism 7 is referred to as a speed change step.

The shift solenoids 9, 10 and lock-up solenoid 11 operate according to control signals from a controller 12. The controller 12 comprises a microcomputer comprising a central processing unit (CPU), read-only memory (ROM), random access memory (RAM) and input/output interface (interface). The controller may also comprise plural microcomputers.

In the automatic operation mode, the controller 12 selects an optimum speed change step by looking up a preset map based on a depression amount ASP of an accelerator pedal and a vehicle travel speed VSP, and controls the shift solenoids 9, 10 corresponding to the selected speed change step.

In the manual mode, the controller 12 selects an upshift or downshift operation via a shift lever operated by the driver, selects respectively one step up or down from the present speed change step, and controls the shift solenoids 9, 10 corresponding to the selected speed change step.

The controller 12 also performs fuel injection control and ignition timing control of the engine 1, calculates a target engine torque, drives the throttle motor 5 to obtain the target engine torque, and adjust an opening of the throttle 4 to control the engine output torque.

To perform the above control, detection data is input as signals to the controller 12 from a throttle sensor 21 which detects the opening of the throttle 4, an accelerator pedal depression sensor 22 which detects an accelerator pedal depression amount APS, a water temperature sensor 23 which detects a cooling water temperature Tw of the engine 1, a rotation speed sensor 24 which detects a rotation speed Ne of the engine 1, a gear position sensor 25 which detects a speed change step GP of the automatic transmission 5, a mode switch 26 which changes over between the automatic operation mode and manual operation mode of the automatic transmission 5, a shift position sensor 27 which detects a position SP of a shift lever, a vehicle speed sensor 28 which detects a vehicle travel speed VSP, and a manual operation detection switch 29 which detects a speed change request generated due to a specific operation of the shift lever by the driver.

Figure 2:
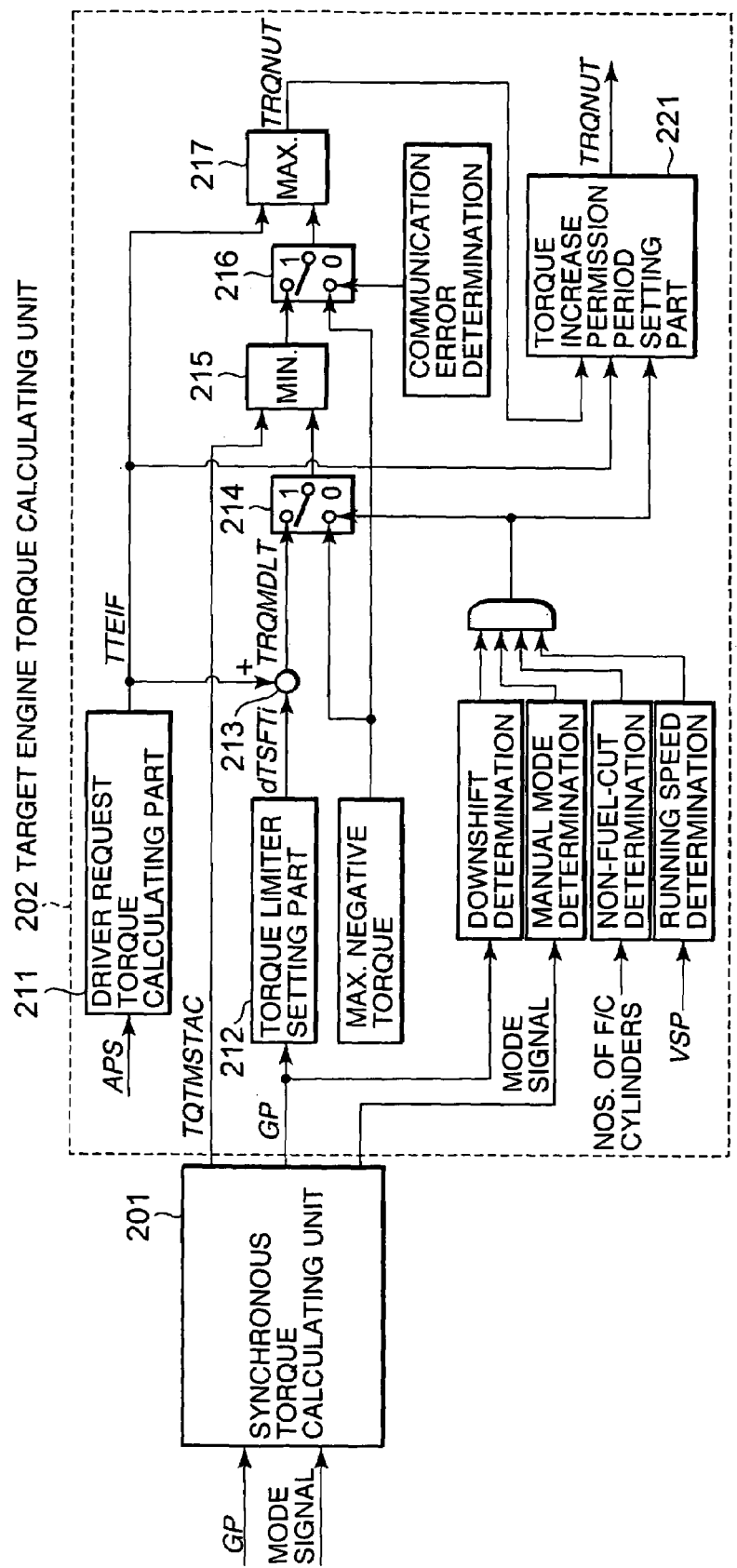
FIG. 2 is a block diagram describing a torque increase control routine during a downshift, performed by a controller according to this invention.

Next, referring to FIG. 2, the engine output torque control during a downshift of the automatic transmission 5 performed by the controller 12, will be described.

The controller 12 comprises a rotation synchronous torque calculating unit 201 and a target engine torque calculating unit 202.

When the driver performs a downshift operation in the manual operation mode, i.e., when a downshift request is detected by the manual operation detection switch 29, the rotation synchronous torque calculating unit 201 estimates the engine rotation speed after downshift, and calculates the rotation synchronous torque TQTMSTAC required to attain the estimated engine rotation speed. The rotation synchronous torque TQTMSTAC corresponds to the first torque of the claims.

The target engine torque calculating unit 202 calculates a target engine torque TRQNUT during downshift.

The target engine torque calculating unit 202 comprises a driver request torque calculating part 211, torque limiter setting part 212, multiplier 213, first output change-over part 214, first comparator 215, second output change-over part 216, second comparator 217 and torque increase permission period setting part 221.

The driver request torque calculating part 211 calculates an engine output torque required by the driver based on the accelerator pedal depression amount APS, and outputs this value to the multiplier 213, second comparing part 217 and torque increase permission period setting part 221 as a required engine torque TTEIF. The required engine torque TTEIF corresponds to the second torque of the claims.

When the manual operation detection switch 29 detects a downshift request, the torque limiter setting part 212 sets dTSFTi# which is used to limit the increase correction to the required engine torque TTEIF. A torque increase amount upper limiting value dTSFTi# is set for each speed change step GP.

Specifically, when the automatic transmission 5 has five speed change steps, four torque increase amount upper limiting values dTSFTi# are set from dTSFT1# to dTSFT4#. The increase amount upper limiting value dTSFTi# set herein, is set to prevent a rapid increase of engine output torque to maintain vehicle safety and performance. The relation dTSFT4#>dTSFT3#>dTSFT2#>dTSFT1# holds.

The multiplier 213 multiplies the required engine torque TTEIF by the torque increase amount upper limiting value dTSFTi#, calculates an engine output torque upper limiting value TRQMDLT during downshift, and outputs the calculation result to the first output change-over part 214.

As shown in the diagram, when all of the downshift determination, manual mode determination, non-fuel cut determination and vehicle speed determination are affirmative, the first change-over part 214 outputs the engine output torque upper limiting value TRQMDLT during downshift to the first comparator 215.

The downshift determination determines whether or not the manual operation detection switch 29 has detected a downshift. The manual mode determination determines whether or not the mode switch 26 has selected the manual operation mode. The non-fuel cut determination determines whether or not the engine 1 is in a non-fuel cut state. The vehicle speed determination determines whether or not the vehicle running speed VSP is equal to or greater than 10 kilometers per hour.

When all the above determinations are negative, a negative maximum torque is output to the first comparator 215. The negative maximum torque is a dummy value to ensure that the required engine torque TTEIF is output as the target engine torque TRQNUT in the second comparator 217, described later. Herein, a positive torque maximum value is supplied as a negative value.

The first comparator 215 outputs the smaller of the output value of the first output change-over part 214 and the rotation synchronous torque TQTMSTAC to the second output change-over part 216.

The second output change-over part 216 outputs the output of the first comparator 215 to the second comparator 217 subject to the condition that there is no communication error between the rotation synchronous torque calculating unit 201 and target engine torque calculating unit 202. When there is a communication error, the negative maximum torque identical to that input into the first output change-over part 214 is output to the second comparator 217.

The second comparator 217 outputs the larger of the output of the second output change-over part 216 and the required engine torque TTEIF to the torque increase permission period setting part 221 as the target engine torque TRQNUT.

The required engine torque TTEIF, target engine torque TRQNUT, and the results of the aforesaid downshift determination, manual mode determination, non-fuel cut determination and vehicle speed determination are input to the torque increase permission period setting part 221. When all the determination results are affirmative, the torque increase permission period setting part 221 calculates a torque increase correction amount TRQUP which is the difference between the target engine torque TRQNUT and required engine torque TTEIF.

The torque increase permission period setting part 221 further sets a torque increase permission period TMRTUP by performing a predetermined calculation based on the torque increase correction amount TRQUP, and performs control of the throttle 4 based on the target engine torque TRQNUT for the duration of the torque increase permission period TMRTUP. If none of the aforesaid conditions are satisfied, the output of the engine 1 is controlled based on the required engine torque TTEIF.

The reason why the non-fuel cut state is included in the above conditions is because increasing torque during fuel cut is contrary to the object of fuel cut which is to reduce the engine output torque, and it adversely affects control stability. Also, including a vehicle travel speed VSP of 10 kilometers per hour or more in the above conditions is because the speed change shock due to downshift at low speed is small, and a torque correction to mitigate speed change shock is not required.

Figure 3:
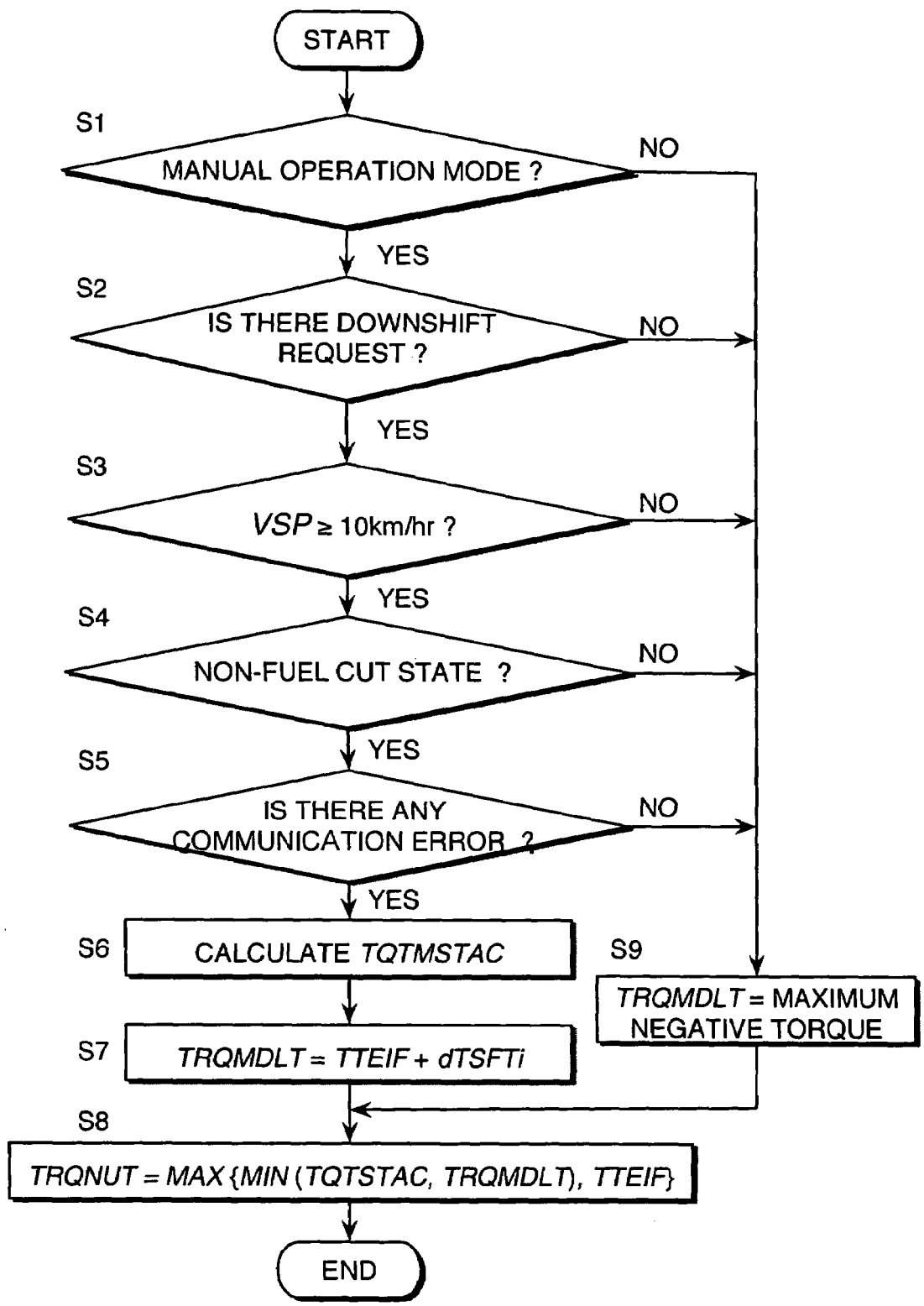
FIG. 3 is a flow chart describing a target engine torque calculation routine during a downshift, performed by the controller.

Next, referring to FIG. 3, a routine for calculating the target engine torque during downshift performed by the controller 12 will be described. This routine corresponds to the functions of the rotation synchronous torque calculating unit 201 and the target engine torque calculating unit 202, excepting for the torque increase permission period setting part 221 of FIG. 2. The controller 12 performs this routine at intervals of 10 milliseconds while the vehicle is running.

In a step S1, the controller 12 determines whether or not the mode switch 26 has selected the manual operation mode.

When the manual operation mode is selected, the controller 12, in a step S2, determines whether or not there is a downshift request from the input signal from the manual operation detection switch 29.

When there is a downshift request, the controller 12, in a step S3, determines whether or not the vehicle running speed is equal to 10 kilometers/hour or more.

When the running speed VSP is equal to 10 kilometers/hour or more, the controller 12, in a step S4, determines whether or not the engine 1 is in the non-fuel cut state.

When the engine 1 is in the non-fuel cut state, the controller 12, in a step S5, determines whether or not communication between the rotation synchronous torque calculating unit 201 and target engine torque calculating unit 202 is error-free and normal.

If there is no communication error, the controller 12, in a step S6, calculates the rotation synchronous torque TQTMSTAC.

In a next step S7, the controller 12 calculates the engine output torque upper limit TRQMDLT during downshift by multiplying the driver request torque TTEIF by the torque increase correction upper limiting value dTSFTi# according to the speed change step.

On the other hand, when any of the determinations S1–S5 is negative, the controller 12, in a step S9, sets a negative maximum torque to the engine output torque upper limiting value TRQMDLT during downshift.

After the processing of the step S7 or step S9, the controller 12 performs the processing of a step S8.

In the step S8, the controller 12 selects the smaller of the rotation synchronous torque TQTMSTAC and the engine output torque upper limiting value TRQMDLT during downshift. Also, the larger of the selected value and the driver request torque TTEIF is set to the target engine torque TRQNUT.

After the processing of the step S8, the controller 12 terminates the routine.

Figure 4:
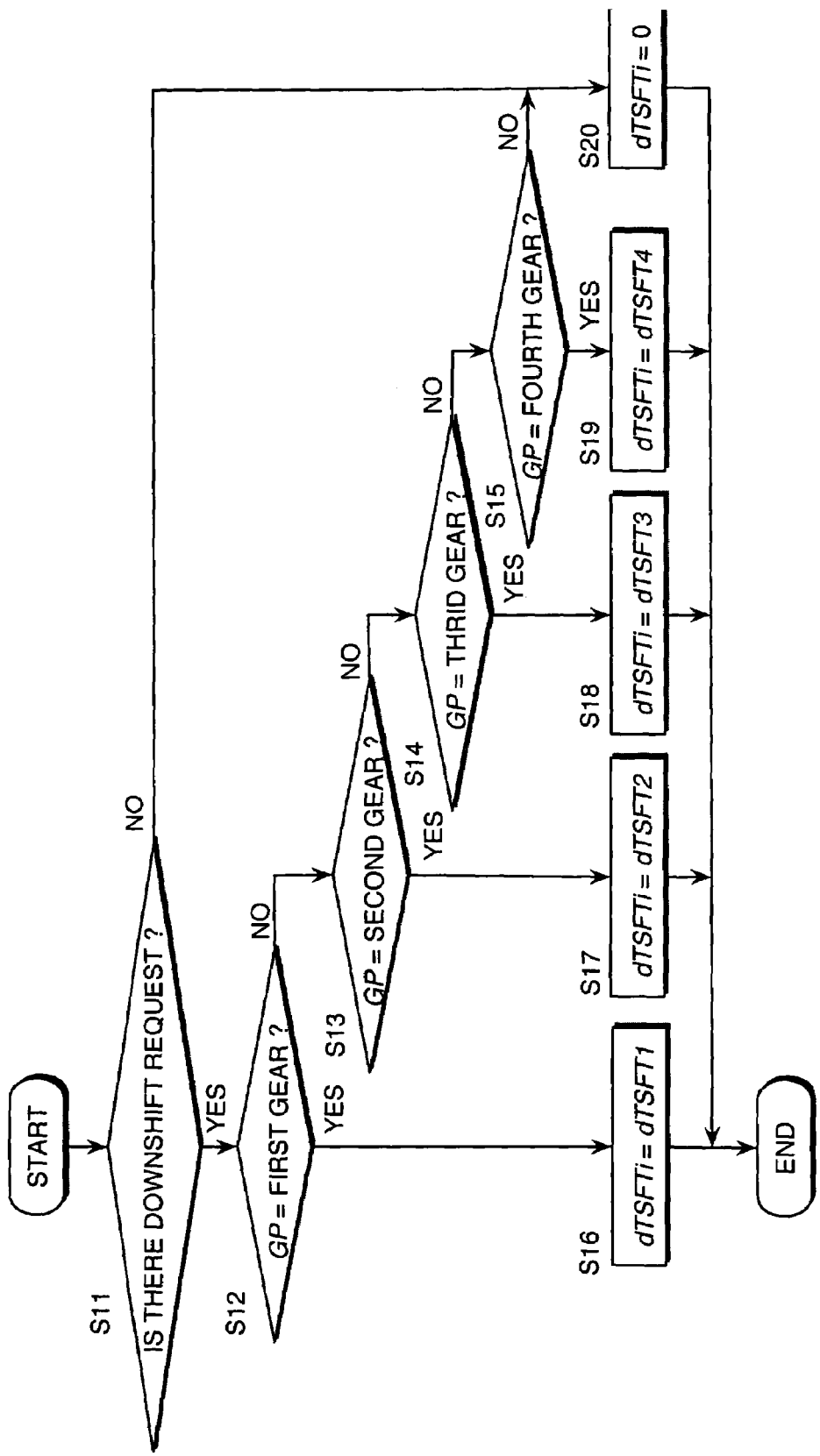
FIG. 4 is a flow chart describing a torque increase amount upper limit setting routine performed by the controller.

Next, referring to FIG. 4, a routine for calculating the torque increase amount upper limiting value dTSFTi# will be described. The controller 12 performs this routine at intervals of 10 milliseconds during vehicle running.

The controller 12, in a step S11, determines whether or not there was a downshift request based on the input signal from the manual operation detection switch 29. If there was no downshift request, the controller 12, in a step S20, resets the torque increase amount upper limiting value dTSFTi# to zero, and terminates the routine.

If there was a downshift request, the controller 12, in steps S12–S15, determines whether or not the current gear position is one of first gear-fourth gear.

When the current gear position GP is first gear, the controller 12, in a step S16, sets the torque increase amount upper limiting value dTSFT1# for first gear to the torque increase amount upper limiting value dTSFTi#, and terminates the routine.

When the current gear position GP is second gear, the controller 12, in a step S17 sets the torque increase amount upper limiting value dTSFT2# for second gear to the torque increase amount upper limiting value dTSFTi#, and terminates the routine.

When the current gear position GP is third gear, the controller 12, in a step S18, sets the torque increase amount upper limiting value dTSFT3# for third gear to the torque increase amount upper limiting value dTSFTi#, and terminates the routine.

When the current gear position GP is fourth gear, the controller 12, in a step S19, sets the torque increase amount upper limiting value dTSFT4# for fourth gear to the torque increase amount upper limiting value dTSFTi#, and terminates the routine.

When the current gear position GP is none of first gear-fourth gear, the controller 12, in the step S20, resets the torque increase amount upper limiting value dTSFTi# to zero, and terminates the routine.

According to this embodiment, dTSFT1# is 35 Newton meter (N.m), dTSFT2# is 55 N.m, dTSFT3# is 855 N.m and dTSFT4# is 126 N.m.

This completes the description of torque increase control during downshift.

The subject matter of this invention is that, during this torque increase control, if the target engine torque fluctuates due to a circuit error, the automatic transmission 5 does not transmit an excessive torque.

Figure 5:
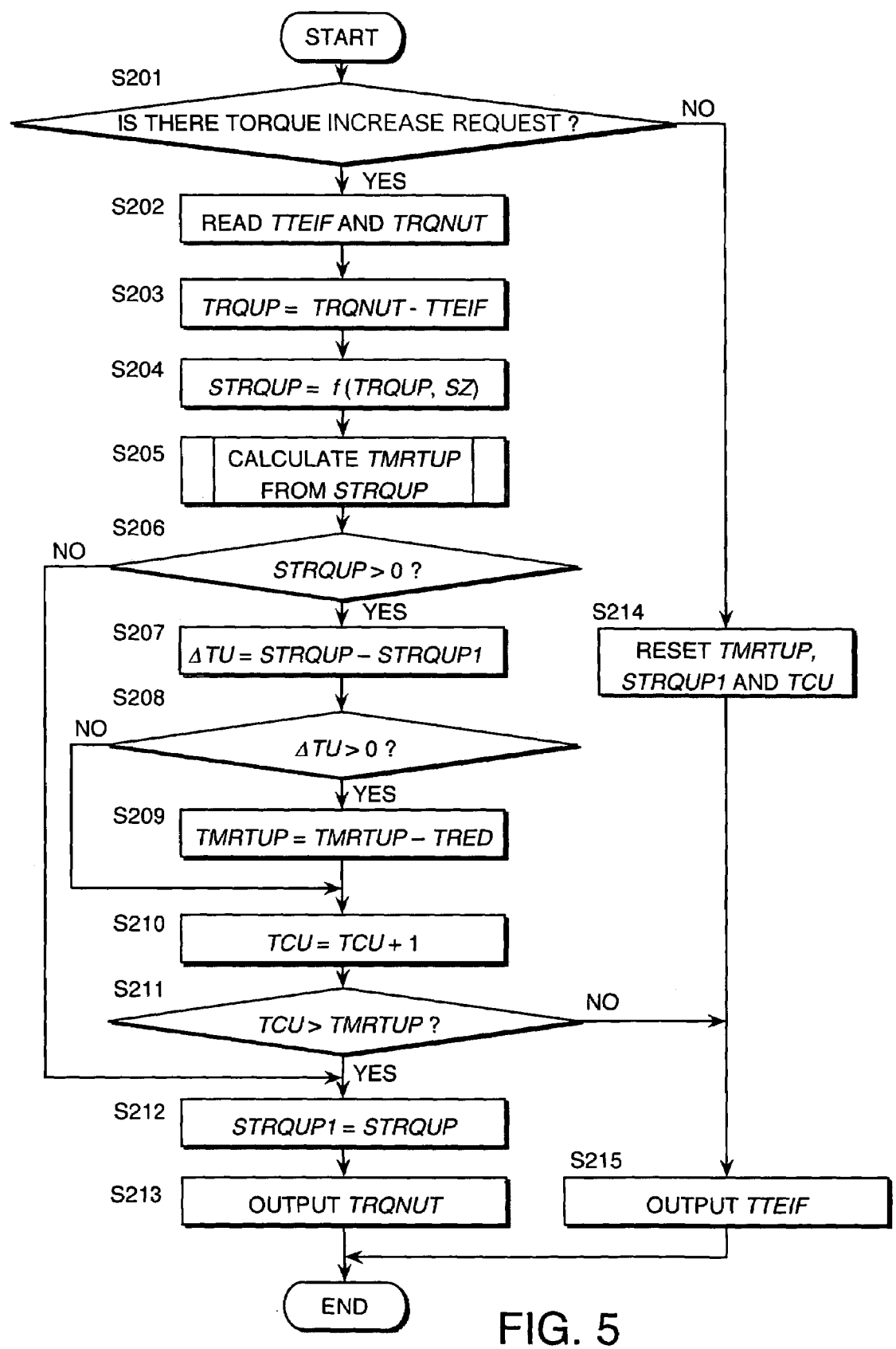
FIG. 5 is a flow chart describing a torque increase control routine performed by the controller.

Referring to FIG. 5, a routine for setting the torque increase permission period performed by the controller 12 for this purpose will now be described. This routine is equivalent to the principle of the torque increase permission period setting part 221 of FIG. 2. The controller 12 performs this routine at intervals of 10 milliseconds during vehicle running.

First, in a step S201, the controller 12 determines whether or not there was a torque increase request. This determination is made by determining whether or not the determinations of the aforesaid steps S1–S5 are all affirmative. When all the determinations of the steps S1–S5 are affirmative, the controller 12 determines that there was a torque increase request, and when the determinations of any of the steps S1–S5 are negative, the controller 12 determines that there was no torque increase request.

When there was no torque increase request, the controller 12, in a step S214, initializes a value relating to torque increase control. Specifically, the torque increase permission period TMRTUP, a predetermined stored value STRQUP1 described hereafter and a timer value TCU described hereafter, are respectively reset to zero.

In a next step S215, the controller 12 outputs the required engine torque TTEIF as the target engine torque TRQNUT, and terminates the routine.

When there was a torque increase request, the controller 12, in a step S202, reads the required engine torque TTEIF and target engine torque TRQNUT. In this case, the step S202 is performed when there was a torque increase request, so the target engine torque TRQNUT is equivalent to the rotation synchronous torque TQTMSTAC after it is limited by the upper limiting value TRQMDLT.

In a next step S203, the controller 12 subtracts the required engine torque from the target engine torque TRQNUT to calculate the torque increase correction amount TRQUP.

In a step S204, the controller 12 converts the torque increase correction amount TRQUP to a correction amount for the gear ratio in a standard state by correcting it according to the gear position GP. Specifically, a gear ratio difference SZ between the gear ratio equivalent to the gear ratio GP and the gear ratio for a predetermined standard gear is calculated, and the torque increase correction amount TRQUP is converted to a reference torque increase correction amount STRQUP by looking up a map corresponding to the gear ratio difference SZ stored beforehand in the ROM of the controller 12.

This conversion is a measure for setting the torque increase permission period using a single map irrespective of the speed change step. When the torque increase permission period is set using a different map depending on the speed change step, the torque increase correction amount TRQUP does not need to be standardized.

Figure 6:
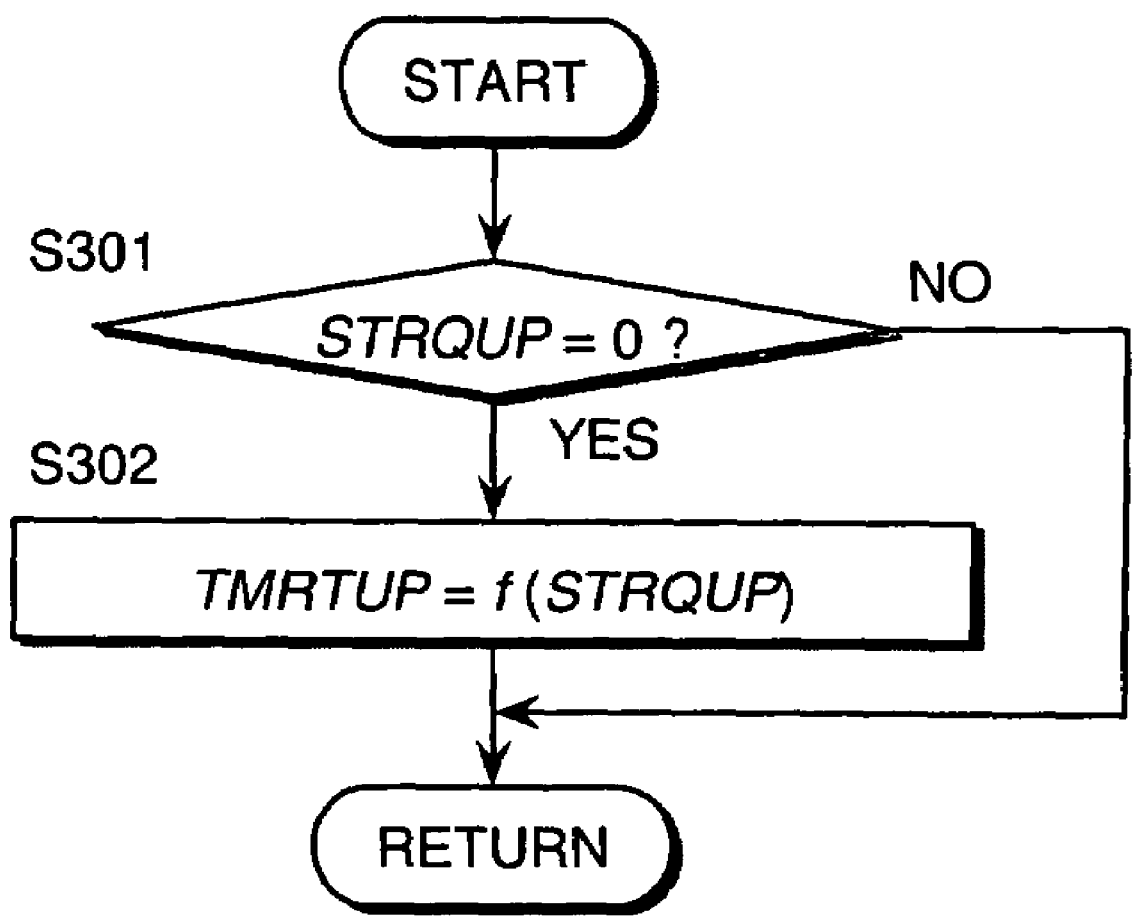
FIG. 6 is a flow chart describing a subroutine for calculating a torque increase permission period TMRTUP performed by the controller.

In a next step S205, the controller 12, by performing the subroutine shown in FIG. 6, calculates the torque increase permission period TMRTUP from the standardized torque increase correction amount STRQUP.

Referring to FIG. 6, the controller 12, in a step S301, determines whether or not the standardized torque increase correction amount STRQUP is zero. When the standardized torque increase correction amount STRQUP is zero, the torque increase permission period TMRTUP is calculated from the standardized torque increase correction amount STRQUP by looking up a map of the torque increase permission period stored beforehand in the ROM of the controller 12 in a step S302.

Herein, as described above, when there is no torque increase request, the standardized torque increase correction amount is initialized in the step S214. Therefore, the standardized torque increase correction amount STRQUP when a torque request first occurs, is zero.

The reason why the torque increase permission period TMRTUP is calculated only when the standardized torque increase correction amount STRQUP is zero, is in order to perform the setting of the torque increase permission period TMRTUP only when a torque increase request first occurs. After the torque increase permission amount TMRTUP is calculated in the step S302, the controller 12 terminates the subroutine. When the standardized torque increase correction amount STRQUP is not zero in the step S301, the controller 12 terminates the subroutine without performing any other processing.

Figure 7:
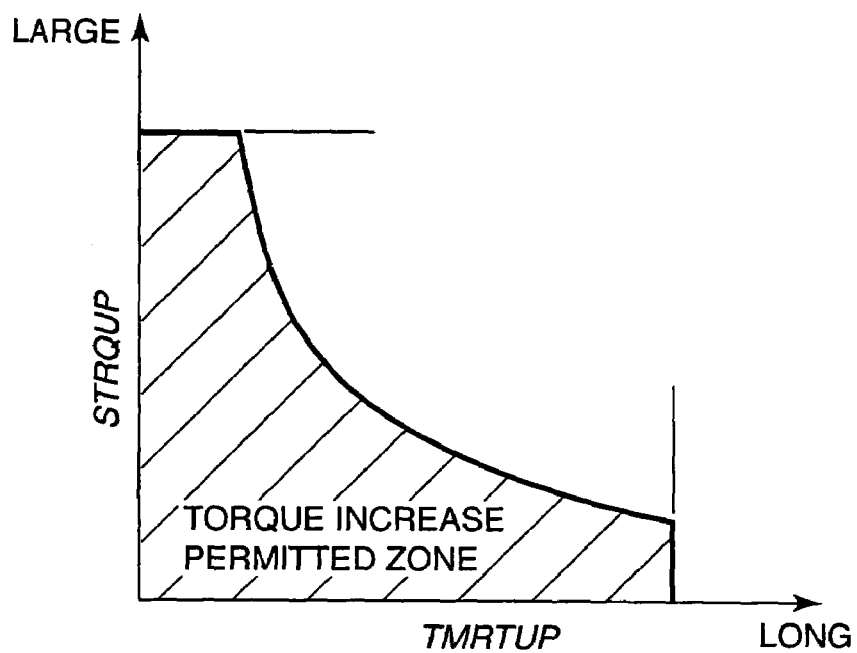
FIG. 7 is a diagram describing the characteristics of a map of the torque increase permission period TMRTUP stored by the controller.

Referring to FIG. 7, the torque increase permission period TMRTUP has the characteristic of becoming shorter as the standardized torque increase correction amount STRQUP increases.

Referring again to FIG. 5, after calculating the torque increase permission period TMRTUP in the step S205, the controller 12, in a step S206, determines whether or not the standardized torque increase correction amount is a positive value.

When the determination of the step S206 is affirmative, the controller 12 performs the processing of a step S207. When the determination of the step S206 is negative, the controller 12 performs the processing of a step S212.

In the step S207, the controller 12 calculates a difference ΔTU between the standardized torque increase correction amount STRQUP and an immediately preceding value STRQUP1 of the standardized torque increase correction amount STRQUP calculated on the immediately preceding occasion the routine was executed.

In a next step S208, the controller 12 determines whether or not the difference ΔTU is larger than zero, i.e., whether or not the standardized torque increase correction amount STRQUP is increasing.

When the difference ΔTU is larger than zero, the controller 12, in a step S209, decrease corrects the torque increase permission period TMRTUP.

Figure 8:
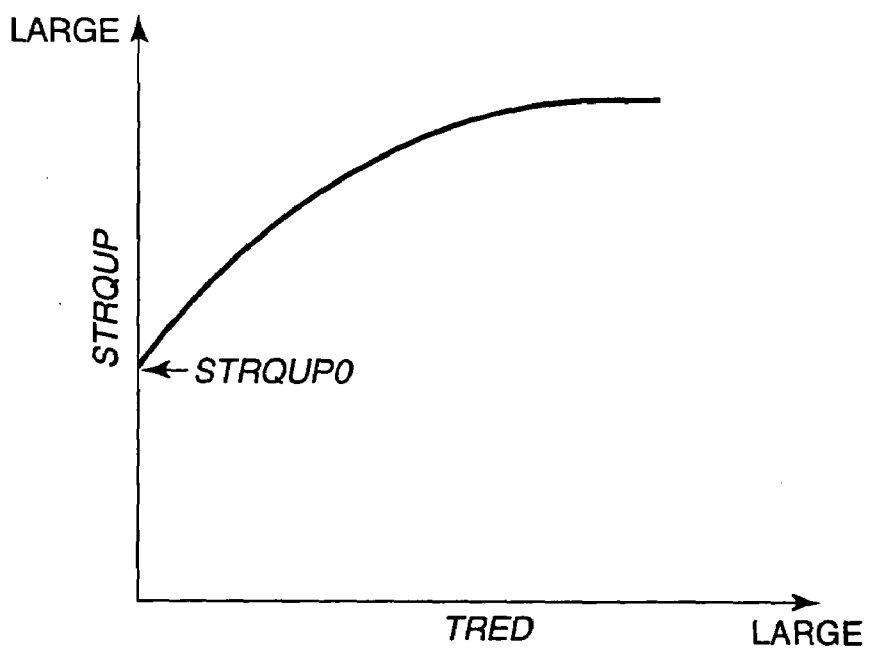
FIG. 8 is a diagram describing the characteristics of a map of a decrease correction amount TRED stored by the controller.

A reduction TRED applied to this decrease correction is performed by looking up a map stored beforehand in the ROM having the characteristics shown in FIG. 8 based on the standardized torque increase correction amount STRQUP. Referring to FIG. 8, in this map, the more the standardized torque increase correction amount STRQUP increases beyond a standard value STRQUP0, the more the decrease amount TRED increases. The fact that the standardized torque increase correction amount STRQUP increases, means that the torque increase correction amount TRQUP is increasing.

In other words, for any speed change step, when the torque increase correction amount TRQUP increases, the torque increase permission period TMRTUP decreases. After the processing of the step S209, the controller 12 performs the processing of a step S210. When the difference ΔTU in the step S208 is not larger than zero, i.e., when the standardized torque increase correction amount STRQUP is not increasing, the controller 12 skips the step S209 and performs the processing of the step S210.

In the step S210, the controller 12 increments the timer value TCU.

In a next step S211, the controller 12 determines whether or not the timer value TCU has reached the torque increase permission period TMRTUP.

When the timer value TCU has not reached the torque increase permission period TMRTUP, the controller 12, in a step S212, stores the standardized torque increase correction amount STRQUP in the RAM as a predetermined stored value STRQUP1.

In the step S206, even if it is determined that the standardized torque increase correction amount STRQUP is not larger than zero, the standardized torque increase correction amount STRQUP is stored in the RAM as the predetermined stored value STRQUP1 in the step S212. In this case, increment of the timer value TCU is not performed.

In a next step S213, the controller 12 outputs the target engine torque TRQNUT, and controls the output torque of the engine 1 to the target engine torque TRQNUT by adjusting the opening of the throttle 4 based on the target engine torque TRQNUT. After the processing of the step S213, the controller 12 terminates the routine.

On the other hand, in the step S211, when the timer value TCU has reached the torque increase permission period TMRTUP, the controller 12, in a step S215, outputs the required engine torque TTEIF as the target engine torque TRQNUT, and terminates the routine.

Next, referring to FIGS. 9A–9D, FIGS. 10A–10D and FIGS. 11A–11D, the variation of the output torque of the engine 1 during downshift of the automatic transmission 5 under the aforesaid control will be described.

FIGS. 9A–9D show the variation of the output torque of the engine 1 when the target engine torque TRQNUT, i.e., the standardized torque increase correction amount STRQUP, increases together with elapsed time during torque increase control.

In this case, in the processing of the steps S207–S211 of FIG. 5, the torque increase correction time TMRTUP is determined based on the standardized torque increase correction amount STRQUP when a downshift request occurs for the first time. In the initial phase during the increase of the target engine torque TRQNUT, the timer value TCU is smaller than the torque increase permission time TMRTUP, so the target engine torque TRQNUT increases in the steps S212, S213.

On the other hand, as the target engine torque TRQNUT increases, the torque increase permission period TMRTUP is decrease corrected by the reduction amount TRED in the step S209 every time the routine is executed. Therefore, provided that the target engine torque TRQNUT continues increasing, the torque increase permission time TMRTUP gradually decreases together with the elapsed time as shown by the solid line in FIG. 9D. Conversely, the timer value TCU increases at a fixed rate every time the routine is executed as shown by the dotted line in FIG. 9D.

Eventually, when the increasing timer value TCU becomes equal to the torque increase permission period TMRTUP, the determination result of the step S211 changes to negative, and the required engine torque TTEIF is output as the target engine torque TRQNUT. Subsequently, when it is determined that there is a torque increase request in the step S201, the determination of the step S211 is negative, so torque increase is not performed. Until it is determined that there is no torque increase request, the initialization of the torque increase permission period TMRTUP, predetermined storage value STRQUP1 and timer value TCU in the step S214 is not performed.

As a result, the torque increase permission period decreases from TMRTUP0 to TMRTUP1, and correspondingly, the torque increase period is shortened. Therefore, a needless increase of rotation speed of the engine 1 due to an excessive engine torque can be prevented. Also, regarding shocks when a speed change of the automatic transmission 5 occurs, the time for which torque increase should be performed tends to be shorter, the larger the torque increase amount. Due to this control, therefore, torque control during speed change can be optimized.

FIGS. 10A–10D show the variation of the output torque of the engine 1 when the target engine torque TRQNUT decreases during the torque increase control accompanying a downshift. This state occurs when the required engine torque TTEIF decreases as shown in FIG. 10C, due for example to the release of the accelerator pedal. When the required engine torque TTEIF decreases, the engine output torque upper limiting value TRQMDLT calculated in the step S7 also decreases, and as a result, the target engine torque TRQNUT calculated in the step S8 also starts to decrease.

In this case, while the engine target torque TRQNUT is increasing, the torque increase permission period TMRTUP shows a decrease, but when the engine target torque TRQNUT starts to decrease, the determination of the step S206 changes to negative, and as a result, subsequent updating of the torque increase permission period TMRTUP stops. Also, updating of the timer value TCU and torque increase permission period TMRTUP in the step S211 are not performed. As a result, until it is determined that there is no torque increase request in the step S201, the increase control of the target engine torque TRQNUT is continued.

FIGS. 11A–11D show the situation when the rotation synchronous torque TQTMSTAC fluctuates for some reason during torque increase control accompanying a downshift. As a result of this fluctuation, the rotation synchronous torque TQTMSTAC may fall below the required engine torque TTEIF.

In this case, the standardized torque increase correction amount calculated in the step S204 is a negative value, so the determination of the step S206 is negative, and decrease correction of the torque increase permission period TMRTUP in the step S209 and incrementation of the timer value in the step S210 are also not performed.

In other words, regarding the time period for which the rotation synchronous torque TQTMSTAC falls below the required engine torque TTEIF, as shown by the dotted line in FIG. 11D, the torque increase permission period is extended.

Also, as shown by the solid line in the figure, after the target engine torque TRQNUT has stopped increasing, the torque increase permission period TMRTUP is maintained at a fixed value. Therefore, compared with the case when the rotation synchronous torque TQTMSTAC does not fall below the required engine torque TTEIF, the timer value TCU reaches the torque increase permission period TMRTUP later, and the torque increase period is longer by a corresponding amount.

When the target engine torque TRQNUT is not increasing, the effect of the output torque of the engine 1 on speed change shocks to the automatic transmission is small, and therefore even if the decrease correction of the torque increase permission period is stopped, a needless increase of engine rotation speed does not occur. In such a case, stopping the decrease correction of the torque increase period does not adversely affect clutch durability and has a desirable effect by definitively preventing speed change shocks.

The contents of Tokugan 2004-028233, with a filing date of Feb. 4, 2004 in Japan, are hereby incorporated by reference.

Although the invention has been described above by reference to certain embodiments of the invention, the invention is not limited to the embodiments described above. Modifications and variations of the embodiments described above will occur to those skilled in the art, within the scope of the claims.

For example, according to the above embodiment, torque control in the manual operation mode was described, but this invention is not limited to the manual operation mode, a desirable effect being obtained even when it is applied to a downshift in the automatic operation mode.

Although the controller 12 in the above embodiment performs both the upshift/downshift control of the transmission 5 and the control of the output torque of the engine 1, it is also possible to perform these controls by separate controllers.

The output torque control of the engine 1 may be performed not only by opening throttle 4, but also by adjusting the fuel injection amount and ignition timing.

In each of the above embodiments, the parameters required for control are detected using sensors, but this invention can be applied to any output torque control device which can perform the claimed control using the claimed parameters regardless of how the parameters are acquired.

The embodiments of this invention in which an exclusive property or privilege is claimed are defined as follows.

What is claimed is:

1. An output torque control device for an engine for use with an automatic transmission for a vehicle, wherein the automatic transmission transmits an output torque of the engine to drive wheels at different speed ratios which are selectively applied, and performs a downshift operation when a downshift signal is ON, the device comprising:
a programmable controller programmed to:
determine whether or not the downshift signal is ON;
increase the output torque of the engine so that a predetermined torque increase amount is realized when the downshift signal is ON;
set a torque increase permission period which permits an increase of the output torque of the engine to be shorter, as the predetermined torque increase amount becomes larger; and
terminate increase of the output torque of the engine when an elapsed time from when the downshift signal is ON reaches the torque increase permission period.

2. The output torque control device as defined in claim 1, wherein the control device further comprises a throttle which adjusts an intake air amount of the engine, and the controller is further programmed to increase the output torque of the engine by increasing the opening of the throttle.

3. The output torque control device as defined in claim 1, wherein the control device further comprises a switch which outputs a downshift command by a vehicle driver operation, and the controller is further programmed to determine that the downshift signal is ON when a downshift command is output.

4. The output torque control device as defined in claim 1, wherein the controller is further programmed to calculate a first torque relating to the output torque of the engine which is desirable to prevent torque shock due to a downshift operation of the automatic transmission, and determine the predetermined torque increase amount based on the first torque.

5. The output torque control device as defined in claim 4, wherein the control device further comprises a sensor which detects a depression amount of a vehicle accelerator pedal, and the controller is further programmed to calculate a second torque relating to the output torque of the engine based on the accelerator pedal depression amount, limit the first torque to a value obtained by adding a predetermined torque increase amount upper limiting value to the second torque, and make the difference between the first torque and second torque after limitation equal to the predetermined torque increase amount.

6. The output torque control device as defined in claim 5, wherein the control device further comprises a sensor which detects a speed ratio applied by the automatic transmission, and the controller is further programmed to set the predetermined torque increase amount upper limiting value to a larger value, as the speed ratio corresponds to higher vehicle running speed.

7. The output torque control device as defined in claim 6, wherein the controller is further programmed to calculate a standardized torque increase correction amount corresponding to a standard speed ratio by adding a correction corresponding to the speed ratio to the difference between the first torque and second torque after limitation, and the torque increase permission period is set to be shorter, as the standardized torque increase correction amount becomes larger.

8. The output torque control device as defined in claim 7, wherein the controller is further programmed to maintain the torque increase permission period at a decrease start point when the first torque has decreased.

9. The output torque control device as defined in claim 7, wherein the controller is further programmed to stop counting the elapsed time while the first torque is less than the second torque.

10. The output torque control device as defined in claim 1, wherein the control device further comprises a sensor which detects a vehicle running speed, and the controller is further programmed not to increase the output torque of the engine when the running speed does not reach a predetermined speed even if the downshift signal is ON.

11. The output torque control device as defined in claim 1, wherein the controller is further programmed to determine whether or not a fuel cut to the engine is performed, and not to increase the output torque of the engine when the fuel cut is performed even if the downshift signal is ON.

12. An output torque control device for an engine for use with an automatic transmission for a vehicle, wherein the automatic transmission transmits an output torque of the engine to drive wheels at different speed ratios which are selectively applied, and performs a downshift operation when a downshift signal is ON, the device comprising:
means for determining whether or not the downshift signal is ON;
means for increasing the output torque of the engine so that a predetermined torque increase amount is realized when the downshift signal is ON;
means for setting a torque increase permission period which permits an increase of the output torque of the engine to be shorter, as the predetermined torque increase amount becomes larger; and
means for terminating increase of the output torque of the engine when an elapsed time from when the downshift signal is ON reaches the torque increase permission period.

13. An output torque control method of an engine, the engine being connected to an automatic transmission for a vehicle, wherein the automatic transmission transmits an output torque of the engine to drive wheels at different speed ratios which are selectively applied, and performs a downshift operation when a downshift signal is ON, the method comprising:
determining whether or not the downshift signal is ON;
increasing the output torque of the engine so that a predetermined torque increase amount is realized when the downshift signal is ON;
setting a torque increase permission period which permits an increase of the output torque of the engine to be shorter, as the predetermined torque increase amount becomes larger; and
terminating increase of the output torque of the engine when an elapsed time from when the downshift signal is ON reaches the torque increase permission period.

* * * * *